United States Patent
Watanabe

(10) Patent No.: US 11,951,691 B2
(45) Date of Patent: Apr. 9, 2024

(54) METHOD FOR PRODUCING FRESHNESS-KEEPING BAG

(71) Applicant: W & Co., Tokyo (JP)

(72) Inventor: Toru Watanabe, Tokyo (JP)

(73) Assignee: W & CO., Tokyo (JP)

( * ) Notice: Subject to any disclaimer, the term of this patent is extended or adjusted under 35 U.S.C. 154(b) by 194 days.

(21) Appl. No.: 17/637,386

(22) PCT Filed: Aug. 24, 2020

(86) PCT No.: PCT/JP2020/031841
§ 371 (c)(1),
(2) Date: Feb. 22, 2022

(87) PCT Pub. No.: WO2021/039717
PCT Pub. Date: Mar. 4, 2021

(65) Prior Publication Data
US 2022/0297387 A1 Sep. 22, 2022

(30) Foreign Application Priority Data

Aug. 23, 2019 (JP) ................. 2019-153011

(51) Int. Cl.
*B29C 65/00* (2006.01)
*B29C 65/08* (2006.01)
*B65D 75/20* (2006.01)

(52) U.S. Cl.
CPC .......... *B29C 66/8511* (2013.01); *B29C 65/08* (2013.01); *B29C 66/43121* (2013.01); *B65D 75/20* (2013.01)

(58) Field of Classification Search
CPC ............... B29C 66/8511; B29C 65/087; B32B 2439/46
See application file for complete search history.

(56) References Cited

U.S. PATENT DOCUMENTS

| | | | | |
|---|---|---|---|---|
| 5,552,013 A | * | 9/1996 | Ehlert | B29C 66/1122 156/580.2 |
| 2015/0367614 A1 | * | 12/2015 | Sasaki | B32B 27/32 428/522 |
| 2018/0093444 A1 | | 4/2018 | Begrow et al. | |

FOREIGN PATENT DOCUMENTS

JP 3259166 B2 2/2002
JP 2002308292 A * 10/2002
(Continued)

OTHER PUBLICATIONS

Machine translation of JP2002308292.*
(Continued)

*Primary Examiner* — Christopher T Schatz
(74) *Attorney, Agent, or Firm* — Crowell & Moring LLP

(57) ABSTRACT

Provided is a production method for a freshness-keeping bag capable of reducing the inflow of oxygen from the outside of the bag to a very low level, and thereby keeping the freshness of a content thereof for a long period of time. The present invention provides a method for producing a freshness-keeping bag formed of a film, wherein the freshness-keeping bag has a band-shaped joining region in which two ends of the film are overlapped and joined together, the joining region comprising a plurality of joined parts in which the two ends of the film are joined together, and a non-joined part which is located between adjacent ones of the joined parts and in which the overlapped ends of the film are not joined together, the non-joined part composing a non-linear ventilation passage communicating between an internal space of the bag and the outside of the bag, the method comprising the step of forming the joined parts by ultrasonic welding, wherein the step of forming the joined parts includes continuously forming the joined parts in the film, while rotating a disk-shaped ultrasonic welding anvil with respect to the film, wherein the ultrasonic welding anvil (Continued)

has a plurality of protrusions formed on an outer periphery thereof continuously at given intervals and correspondingly to the configuration of the joined parts of the bag.

4 Claims, 11 Drawing Sheets

(56) References Cited

FOREIGN PATENT DOCUMENTS

| | | |
|---|---|---|
| JP | 6052729 B2 | 12/2016 |
| JP | 2019-131215 A | 8/2019 |
| WO | WO 2018/064340 A1 | 4/2018 |

OTHER PUBLICATIONS

Official Action of Japanese Patent Application No. 2019 153011 dated Dec. 2, 2019, including English translation, 6 pages.
Official Action of Japanese Patent Application No. 2019 153011 dated Apr. 20, 2020, including English translation, 6 pages.

\* cited by examiner

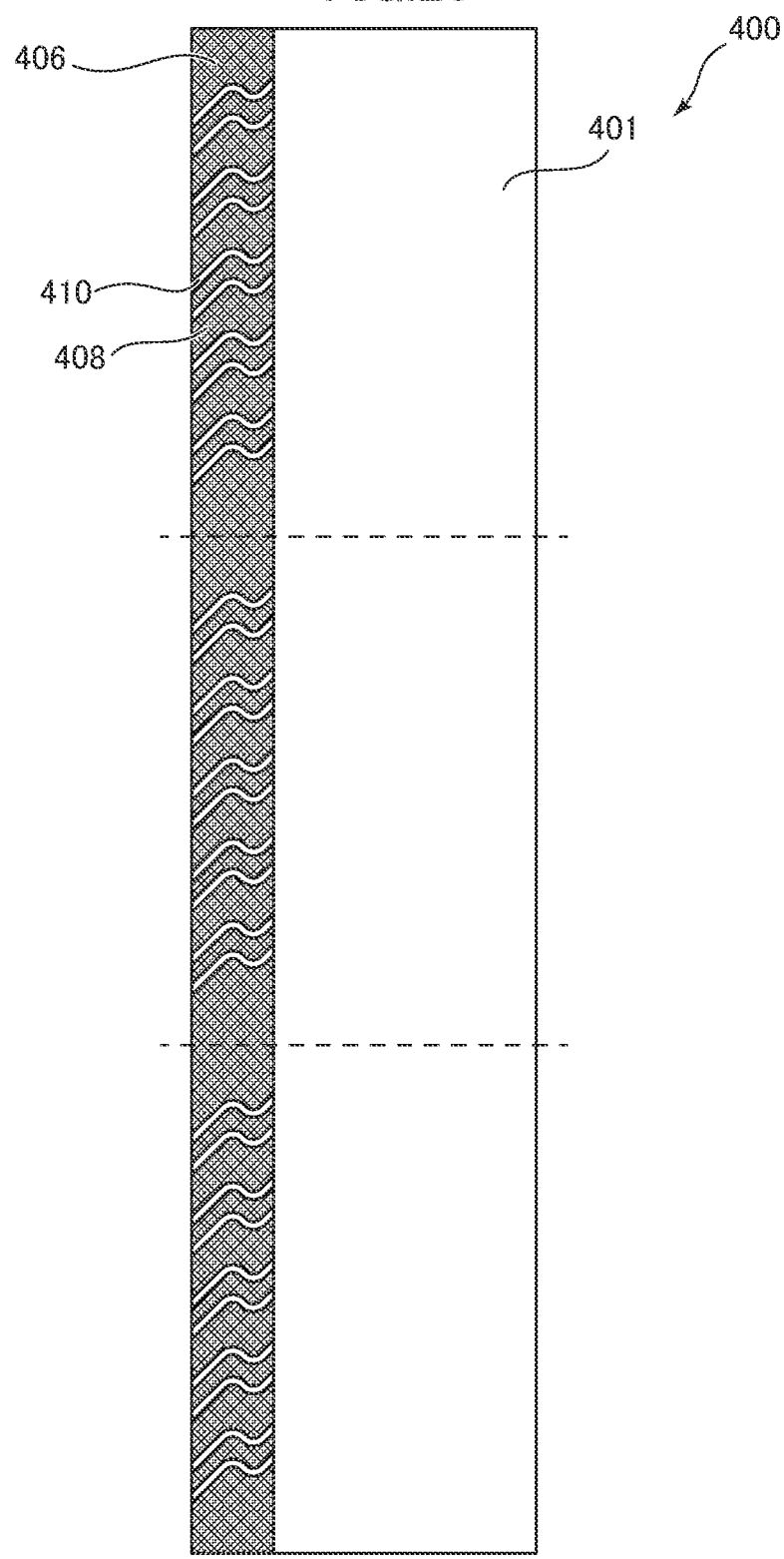

… (1)

METHOD FOR PRODUCING FRESHNESS-KEEPING BAG

This application is a 371 application of PCT/JP2020/031841 having an international filing date of Aug. 24, 2020, which claims priority to JP2019-153011 filed Aug. 23, 2019, the entire content of each of which is incorporated herein by reference.

TECHNICAL FIELD

The present invention relates to a production method for a freshness-keeping bag, and more specifically, to a production method for a freshness-keeping bag capable of suppressing deterioration in freshness of foods or fresh flowers which produce carbon dioxide through respiration or fermentation during storage.

BACKGROUND ART

There is a growing need for a bag capable of preserving foods or the like which produce carbon dioxide through respiration or fermentation, such as vegetables, fruits, fresh flowers, coffee beans, and processed foods, while maintaining freshness thereof, or a bag capable of preserving fresh flowers for a long period of time.

The bag for preserving foods or the like for a long period of time is required to have two contradictory functions: one function of discharging carbon dioxide and water vapor produced there inside, and the other function of preventing the inflow of oxygen from the outside. This is because if the discharge of carbon dioxide or water vapor is insufficient, the internal pressure of the bag will rise, which is likely to damage the bag, and, on the other hand, if the bag fails to prevent the inflow of oxygen, the freshness of contents of the bag will be deteriorated due to oxidation.

In response to such a need, there has been proposed a fruit and vegetable packaging article (bag) in which non-joined parts arranged in a stripe pattern are provided in a heat-sealing region of the bag, wherein each of the non-joined parts is used as a flow passage communicating with the outside of the bag (the below-mentioned Patent Document 1). In this bag, each of the non-joined parts (flow passages) has a linear (i.e., elongated rectangular) planar shape having a width of 0.1 to 5 mm and a length of 1 to 20 mm.

In this bag, the flow passages allow the inside of the bag to be maintained at a relatively low oxygen concentration and a relatively high carbon dioxide concentration, thereby keeping the freshness of the fruit and vegetables there inside. This bag can keep the freshness of contents for a certain period of time. However, since the length of each of the flow passages is relatively short, the inflow of oxygen from the outside is relatively high, leading to difficulty in keeping the freshness of the fruits and vegetables for a long period of time.

With a view to addressing this problem, there has been proposed a packaging article in which an air vent extending obliquely and having a width of 3 mm or more is provided in a center sealing region (below-mentioned Patent Document 2). This configuration makes it possible to increase the length of the ventilation passage.

CITATION LIST

Patent Document

Patent Document 1: JP-B 3259166
Patent Document 2: JP-B 6052729

SUMMARY OF INVENTION

Technical Problem

However, in the configuration of Patent Document 2, since the air vent (flow passage) has a relatively wide width of 3 cm or more, dew condensation is more likely to occur in the air vent (ventilation passage). As a result, there is a problem that water produced by the dew condensation occupies the internal space of the air vent, and blocks the flow of air in the air vent, leading to difficulty in sufficiently keeping the freshness.

Further, in both the configurations of Patent Documents 1 and 2, since the ventilation passage is configured to extend linearly in the sealing region, there is a problem that the strength of the sealing region is reduced in a direction along which the ventilation passage extends.

Further, in both the configurations of the patent documents 1 and 2, since the ventilation passage is formed by heat sealing, there is a problem that it is difficult to accurately control the width and shape of a ventilation passage to be formed.

The present invention has been made in view of such problems, and an object thereof is to provide a production method for a freshness-keeping bag capable of reducing the inflow of oxygen from the outside of the bag to a very low level, and thereby keeping the freshness of a content of the bag for a long period of time.

Another object of the present invention is to provide a production method for a freshness-keeping bag in which deterioration in strength of a portion of the bag formed with a ventilation passage is suppressed.

Solution to Technical Problem

The present invention provides a method of producing a freshness-keeping bag formed of a film, wherein the freshness-keeping bag has a band-shaped joining region in which two ends of the film are overlapped and joined together with a width of 5 mm to 15 mm, the joining region comprising a plurality of joined parts in which the two ends of the film are joined together, and a non-joined part which is located between adjacent ones of the joined parts and in which the overlapped ends of the film are not joined together, the non-joined part composing a non-linear ventilation passage communicating between an internal space of the bag and an outside of the bag, the ventilation passage having a width W and a length L satisfying the following relations: $0.2$ mm$\leq$W$\leq$3 mm, and 10 mm$\leq$L$\leq$50 mm, respectively, the method comprising the step of forming the joined parts by ultrasonic welding, wherein the step of forming the joined parts includes continuously forming the joined parts in the film, while rotating a disk-shaped ultrasonic welding anvil with respect to the film, the ultrasonic welding anvil having a plurality of protrusions formed on an outer periphery thereof continuously at given intervals and correspondingly to a configuration of the joined parts of the bag.

In the method of the present invention having the above feature, the joined parts are formed by ultrasonic welding, so that it becomes possible to accurately control the width and shape of the ventilation passage composed of the non-joined part located between adjacent ones of the joined parts. This makes it possible to form the ventilation passage to have a size and shape allowing air ventilation suited to a content to be stored in the bag.

In a preferred embodiment of the present invention, the film has an oxygen barrier layer.

In another preferred embodiment of the present invention, the film has a thickness of 20 µm to 200 µm.

In yet another preferred embodiment of the present invention, the film is one selected from the group consisting of polyethylene, polypropylene, vinyl chloride, styrene acrylonitrile copolymer, and laminate films thereof.

Effect of Invention

The present invention provides a production method for a freshness-keeping bag capable of reducing the inflow of oxygen from the outside of the bag to a very low level, and thereby keeping the freshness of a content of the bag for a long period of time.

Further, the present invention provides a production method for a freshness-keeping bag in which deterioration in strength of a portion of the bag formed with a ventilation passage is suppressed.

BRIEF DESCRIPTION OF DRAWINGS

FIG. 20 is a diagram schematically showing a cylindrical body used for producing the bag.

DESCRIPTION OF EMBODIMENTS

Figure 1:
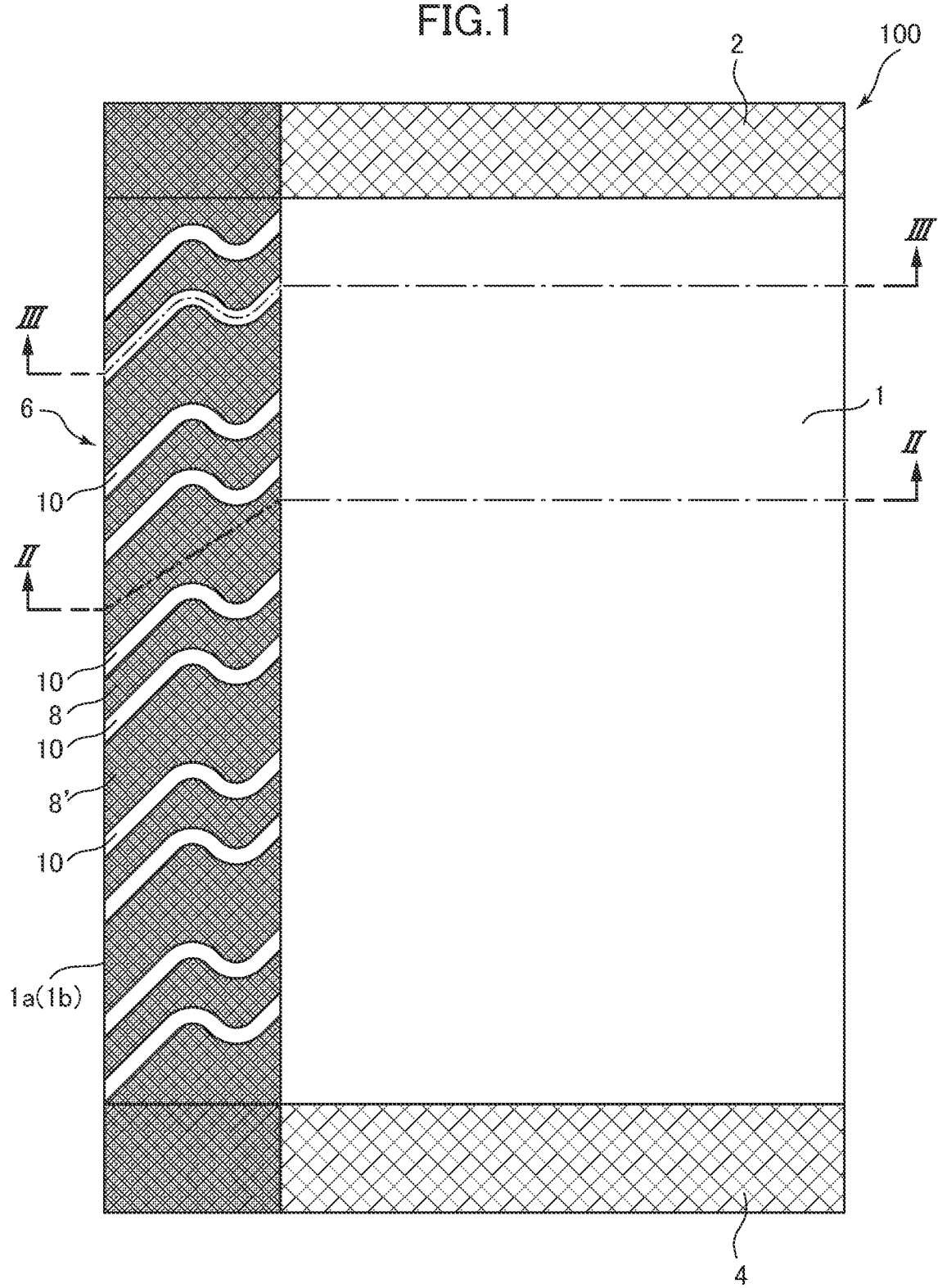
FIG. 1 is a schematic plan view of a bag 100 produced by a production method according to a preferred embodiment of the present invention.
Figure 2:
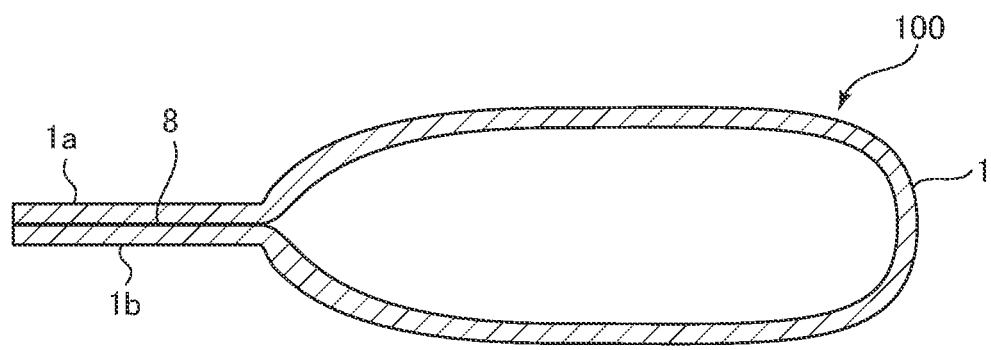
FIG. 2 is a schematic sectional view taken along the line II-II in FIG. 1.
Figure 3:
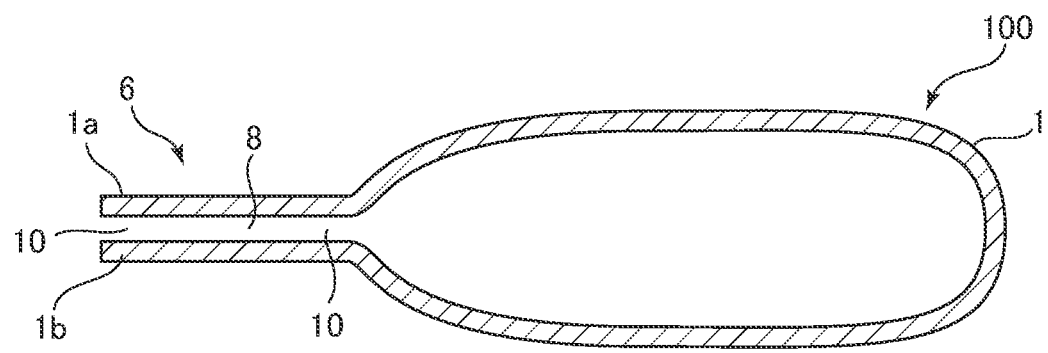
FIG. 3 is a schematic sectional view taken along the line III-III in FIG. 1.

In accordance with the drawings, the configuration of a bag 100 produced by a production method of a preferred embodiment of the present invention will now be described in detail. FIG. 1 is a schematic plan view of the bag 100 produced by the production method according to the preferred embodiment of the present invention. FIG. 2 is a sectional view taken along the line II-II in FIG. 1, and FIG. 3 is a sectional view taken along the line III-III in FIG. 1. In this application, dimensional ratios among elements or components in the drawings are not exactly represented for the sake of clarity.

For example, the bag 100 is a bag having a rectangular planar shape and used for storing a food item such as coffee. The bag 100 in this embodiment has a size of 20 cm×40 cm, but the present invention is not limited to this size.

The bag 100 is formed of a film 1. The film used for the bag 100 is preferably a film of amorphous polymer. Specific examples thereof include films of polystyrene, acrylic resin, vinyl chloride, polycarbonate, and styrene acrylonitrile copolymer.

The film 1 may be a laminate film composed of a laminate of a plurality of films made of different materials. Examples of the laminate film include a laminate film in which a polystyrene film is laminated on the inner side of a polyester, polyethylene or polypropylene film.

As the film 1, it is possible to use a film composed of a laminate of an oxygen barrier film and one or more other films. As the oxygen barrier film, it is possible to use any of heretofore-known oxygen barrier films, such as: a film made of a polymer comprising vinyl alcohol or vinylidene chloride as a constituent; a polymer film on which any of silica, alumina and aluminum is vapor-deposited; and a metal foil layer. It is possible to use a laminate film in which polystyrene is laminated on the inner side of this oxygen barrier film.

The film 1 may be transparent or may be opaque. In a case where a content of the bag can be degraded by sunlight, it is preferable to use an opaque packaging film. Further, in order to enhance aesthetic quality, the film may have a surface subjected to printing.

The thickness of the film 1 is preferably 10 µm to 300 µm, more preferably 15 µm to 200 µm, even more preferably 20 µm to 100 µm. This is because if the thickness of the film is less than 10 µm, the strength of the bag can be insufficient, and if it is greater than 300 µm, it can be disadvantageous in terms of cost.

The bag 100 has a shape obtained by folding a horizontally-long rectangular film 1 in two along the center line thereof extending in an up-down direction. Upper and lower ends of the bag 100 are completely sealed by a top seal 2 and a bottom seal 4 each formed by heat sealing. These seals 2, 4 may be formed by another methods, such as adhesion by an adhesive, or sealing by a tape.

Alternatively, a top seal section can be formed using an openable and closable fastener. Further, the top seal may be formed after a content is placed into the bag 100, without being provided initially.

Further, one lateral end (left end in FIG. 1) of the bag 100 in which opposed lateral ends 1a, 1b of the film 1 are overlapped together is joined and closed by a band-shaped joining region 6 extending over the entire length of the overlapped portion of the lateral ends 1a, 1b of the film 1. In the bag 100, the joining region 6 serves as s side seal section.

In the bag 100, the band-shaped joining region 6 has a width of 5 mm to 15 mm. The width of the band-like joining region 6 is more preferably 6 mm to 13 mm, even more preferable 8 mm to 11 mm.

If the width of the joining region 6 is less than 5 mm, there can arise problems, such as insufficiency of the strength of the joining region, and difficulty in ensuring the length of the after-mentioned a ventilation passage. On the other hand, if the width of the joining region 6 is greater than 15 mm, there can arise problems, such unevenness of jointing, and difficulty in making the width of the after-mentioned ventilation passage constant.

In the band-shaped joining region 6, a narrow ultrasonically-joined part 8 and a wide ultrasonically-joined part 8' which are approximately S-shaped ultrasonically-fused parts (ultrasonically-joined parts) having different lengths (width) in an axial direction of the belt-shaped joining region are arranged alternately in a longitudinal direction of the belt-shaped joining region. Each of the ultrasonically-fused parts (jointed parts) 8, 8' is a portion of the film 1 in which the lateral ends 1a, 1b of the film 1 are joined and integrated by ultrasonic fusion, and is formed by overlapping the lateral ends 1a, 1b of the film 1 and fusing them together using an ultrasonic fusion apparatus as will be described later (FIGS. 1 and 2).

An area between adjacent ones of the ultrasonically-fused parts (joined parts) 8, 8' is formed as a non-joined part 10 in which the overlapped lateral ends 1a, 1b of the film 1 are not joined (fused) together. Since each of the ultrasonically-fused part 8 has a thick-walled, approximately S shape, as described above, the non-joined part 10 between adjacent ones of the ultrasonically-fused parts 8 also has an approximately S shape. In the bag, each of the non-joined parts 10 has the same size and shape.

In the bag 100, since the thick-walled, approximately S-shaped ultrasonically-fused parts (ultrasonically-joined parts) 8, 8', having different widths are arranged alternately in the longitudinal direction, an interval between adjacent ones of the non-joined parts 10, 10 varies alternately. In other words, in the bag 100, a plurality of non-joined part pairs each consisting of two non-joined parts 10, 10 disposed in adjacent relation are arranged in the joining region 6 at given intervals.

An inner end of the non joined part 10 opens to an internal space of the bag 100, and an outer end of the non-joined part 10 opens to an external space of the bag 100. Thus, a ventilation passage 10 composed of the non-joined part 10 serves as a constant-width S-shaped (i.e., non-linear) ventilation passage communicating between the internal space of the bag 100 and the outside (FIGS. 1 and 3).

As a result, in the bag 100, a plurality of S-shaped ventilation passages 10 oriented in the same direction are regularly formed in the side seal section.

In the bag 100, the width W of the non-joined part (ventilation passage) 10 is set to be 0.2 mm to 3 mm. The width W of the ventilation passage 10 is more preferably 0.3 mm to 2.5 mm, even more preferably 0.5 mm to 2.0 mm.

By setting the width W of the ventilation passage 10 to be 0.2 mm to 3.0 mm, it becomes possible to satisfy both of releasing carbon dioxide and water vapor produced inside the bag 100 and preventing intrusion of oxygen from the outside of the bag 100. Further, when the bag 100 is moved, gas becomes less likely to flow inside the ventilation passage 10, and thud oxygen becomes less likely to intrude from the outside.

In the bag 100, the length L of the ventilation passage 10 is set to be 20 mm to 50 mm. It should be noted here that the length L of the ventilation passage 10 means a length from the inner end to the outer end of the ventilation passage 10 along the central axis of the ventilation passage 10.

The length L of the ventilation passage 10 is more preferably 22 mm to 45 mm, even more preferably 25 mm to 40 mm.

In the bag 100, by setting the length L of the ventilation passage 10 to be 20 mm to 50 mm, it becomes possible to satisfy both of releasing carbon dioxide and water vapor produced inside the bag 100 and preventing intrusion of oxygen from the outside of the bag 100.

Further, in the bag 100, the ratio L/W of the length L to the width W of the ventilation passage 10 is set to be 10 to 200. This is because if the ratio L/W of the length L to width W is less than 10, a content preserving property significantly deteriorates, and if this ratio is greater than 200, water can condense inside the ventilation passage, leading to insufficient discharge of carbon oxide.

The ratio L/W of the length L to width W of the ventilation passage 10 is more preferably 15 to 150, even more preferably 20 to 100.

Further, in the bag 100, the interval of the ventilation passage 10 is set to be 1 mm to 100 mm. By setting the interval of the ventilation passage 10 to 1 mm or less, it becomes possible to ensure accurate in the shape of the ventilation passage. Further, by setting the interval to 100 mm of less, it becomes possible to provide the ventilation passage 10 by a required number.

The internal of the ventilation passage 10 is more preferably 2 mm to 50 mm, even preferably between 3 mm and 15 mm.

In the bag 100, the number of ventilation passages 10 to be formed in the bag 100 is set to one or more. However, it is preferably 3 to 100, more preferably 5 to 75.

Particularly when storing fruits and vegetables which produce a relatively large amount of carbon dioxide during storage, it is preferable to set the number of ventilation passages to be 3 to 100, more preferably 5 to 75. In this case, it is possible to desirably prevent a situation where the ventilation passages 10 from being blocked by water, leading to insufficiency of discharge of carbon dioxide.

FIGS. 4 to 15 are schematic diagrams showing various modifications of the shape of the non-linear ventilation passage 10.

Figure 4:
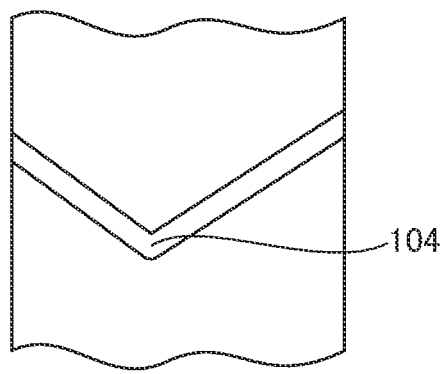
FIG. 4 is a schematic diagram showing a modification of a ventilation passage composed of a non-joined part.
Figure 5:
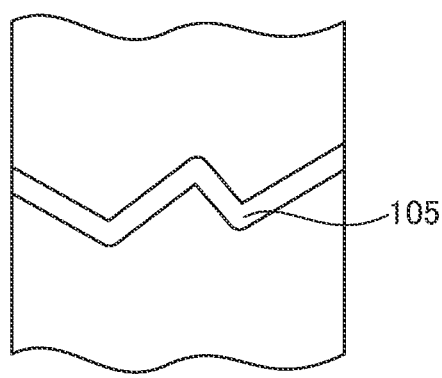
FIG. 5 is a schematic diagram showing another modification of the ventilation passage composed of the non-joined part.

The ventilation passage in the present invention may be composed of a plurality of straight parts continuously connected so as to form one or more angular bent areas, such as a V-shaped ventilation passage 104 as shown in FIG. 4, or a W-shaped ventilation passage 105 as shown in FIG. 5.

Figure 6:
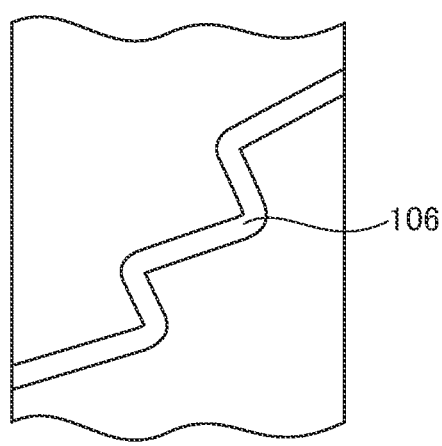
FIG. 6 is a schematic diagram showing yet another modification of the ventilation passage composed of the non-joined part.
Figure 11:
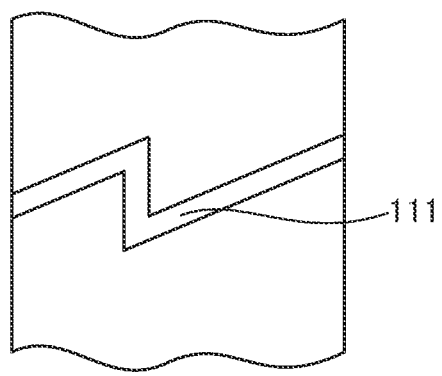
FIG. 11 is a schematic diagram showing an additional modification of the ventilation passage composed of the non-joined part.

Alternatively, the ventilation passage in the present invention may be an obliquely-extending, W-shaped ventilation passage 106 as shown in FIG. 6. Alternatively, the ventilation passage in the present invention may be any of four types of ventilation passages 107, 108, 109, 110 having a shape in which a plurality of curbed parts are connected by one or more straight parts, as shown in FIGS. 7 to 10. Alternatively, the ventilation passage in the present invention may be a lightning-shaped or zigzag-shaped ventilation passage 111 as shown in FIG. 11.

The ventilation passage in the present invention is not limited to the above specific examples, but may include a ventilation passage having other polygonal line or curve shapes, or any combination thereof.

Figure 12:
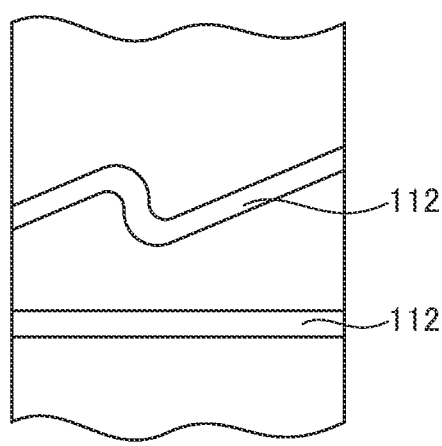
FIG. 12 is a schematic diagram showing yet an additional modification of the ventilation passage composed of the non-joined part.
Figure 13:
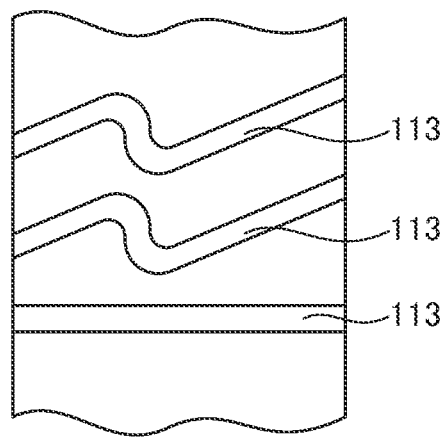
FIG. 13 is a schematic diagram showing still an additional modification of the ventilation passage composed of the non-joined part.
Figure 14:
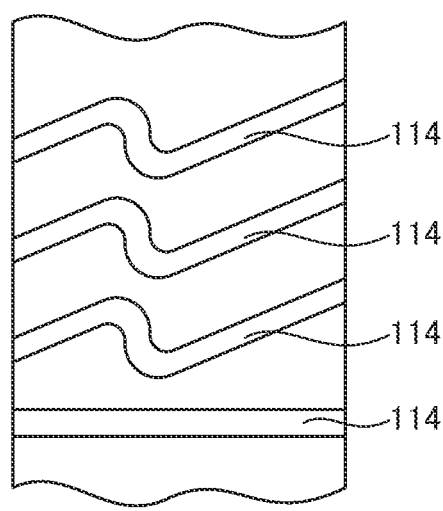
FIG. 14 is a schematic diagram showing other modification of the ventilation passage composed of the non-joined part.

For example, as shown in FIGS. 12 to 14, it may be any of three ventilation passages 112, 113, 114 each comprising a combination of a non-linear ventilation passage and a linear ventilation passage.

The linear ventilation passage comprised in each of the ventilation passages 112, 113, 114 may be provided in a direction perpendicular to the longitudinal direction of the joining region 6, or may be provided obliquely with respect to the longitudinal direction of the joining region 6. The length L of the linear ventilation passage comprised in each of the ventilation passages 112, 113, 114 is preferably 10 mm to 20 mm, more preferably 10 mm to 15 mm, and the width W thereof is preferably 0.3 mm to 1.5 mm, more preferably 0.3 mm to 1.0 mm. By setting the length L and width W of the linear ventilation channel to fall within the above ranges, it becomes possible to satisfy both of releasing carbon dioxide and water vapor produced inside the bag 100, and preventing intrusion of oxygen from the outside of the bag 100.

In the above-mentioned bag 100, the band-shaped joining region 6 having the ultrasonically-fused part (ultrasonically-joined part) 8 is provided in the side seal section. Alternatively, the band-shaped joining region 6 having the ultrasonically-fused part (ultrasonically-joined part) 8 may be formed in any seal section other than the side seal section, e.g., a seal section corresponding to the top seal 2 or the bottom seal 4.

Figure 15:
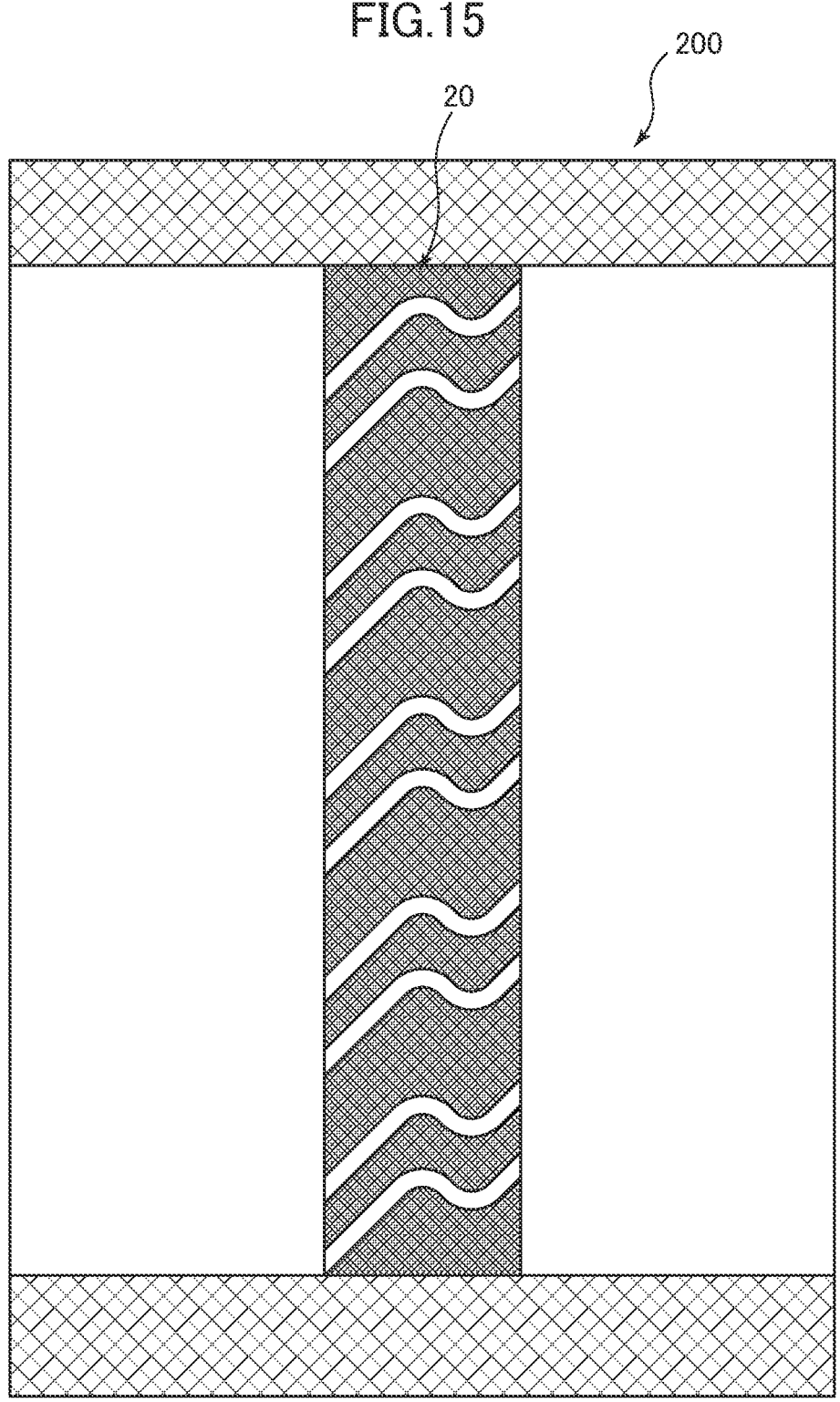
FIG. 15 is a schematic plan view of a modification of the bag.

For example, in a bag 200 which is sealed in a center seal section 20, as shown in FIG. 15, this center seal section 20 may be formed as the above-mentioned band-shaped joining region having the ultrasonically-fused part (ultrasonically-joined part) 8 and the non-joined part (ventilation passage).

Further, although the above-mentioned bag 100 is constructed by overlapping opposed ends of one film, it may be constructed using a plurality of films.

The following description will be made about production of the bag 100 by a production method according to a preferred embodiment of the present invention. The production method according to a first embodiment is configured to form the above bag or the like, e.g., by partially joining two lateral ends 1a, 1b of a rectangular-shaped film 1 by an ultrasonic welding method.

In the production method according to this embodiment, first of all, a horizontally-long rectangular-shaped film 1 constituting the bag 100 is prepared. Then, the film 1 is folded in two along the center line thereof extending in an up-down direction, and opposed lateral ends 1a, 1b thereof are overlapped together.

Then, at least the overlapped lateral ends 1a, 1b of the film 1 are heated to a given temperature (30 to 75° C.). Heating is preferably performed by a heating roll, an infrared heating method, etc.

Next, the heated film is subjected to static elimination. Since the heated film becomes pliable due to decrease in its elasticity, it is more likely to be electrostatically charged, because when it comes into contact with an object such as conveyance rolls, a contact area thereof with the object increases, etc. To eliminate the electrostatic charges, it is preferable to perform the static elimination before ultrasonic welding.

Specifically, the static elimination is performed using ionic wind, a static eliminating brush or the like. Preferably, the static elimination is performed such that the surface potential of the film after completion of the static elimination ionization is 1 kV or less. The surface potential can be measured using, e.g., a surface potentiometer MODEL 34-1B manufactured by Trek Japan Co. Ltd. The static elimination suppresses adhesion of dust caused by such electrostatic charging.

The absolute value of the surface potential of the film after completion of the static elimination is preferably 1 kV or less, from a viewpoint of preventing adhesion of dust. The surface potential can be measured using, e.g., the surface potentiometer MODEL 34-1B manufactured by Trek Japan Co. Ltd.

Then, upper and lower ends of the overlapped lateral ends 1a, 1b of the film are joined by heat sealing or the like, to temporarily fasten the overlapped lateral ends 1a, 1b together so as to prevent relative displacement thereof. This temporary fastening makes it possible to prevent relative displacement of the overlapped lateral ends 1a, 1b.

Then, by using an ultrasonic welding method, a plurality of linear ultrasonically-fused parts 8, 8' are formed in the overlapped lateral ends 1a, 1b of the film 1 at given intervals, thereby providing a plurality of joined parts.

Figure 16:
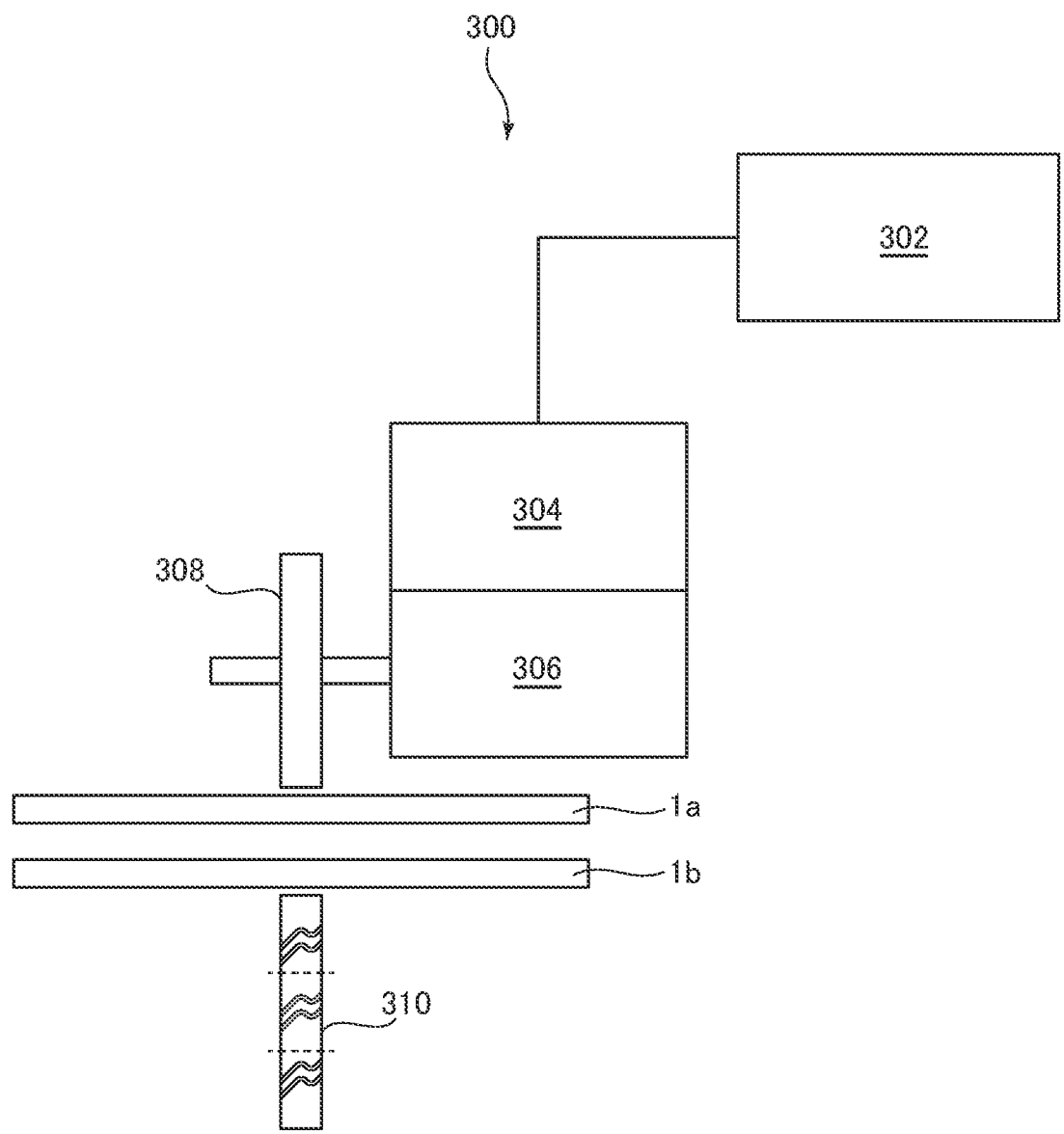
FIG. 16 is a diagram schematically showing the configuration of a welding apparatus used for production of the bag.

FIG. 16 is a diagram schematically showing the configuration of a welding apparatus 300 used for the ultrasonic welding method in the production method according to this embodiment.

As shown in FIG. 16, the welding apparatus 300 is a rotary welding apparatus comprising: an ultrasonic wave oscillator 302 configured to convert 50 Hz or 60 Hz commercial electricity into a high frequency signal having a frequency of about 15 to 70 KHz; a converter 304 configured to convert this signal into mechanical vibration; a booster 306 configured to amplify the mechanical vibration; a disk-shaped horn 308 configured to transmit the amplified vibration to a welding target (film 1); and a disk-shaped anvil 310 configured to nip the film 1 in cooperation with the disk-shaped horn 308. Preferably, the anvil 310 is capable of controlling the temperature thereof.

In the welding apparatus 300 used in the production method according to this embodiment, the horn 308 has a disk shape whose outer peripheral surface is smooth. On the other hand, a plurality of protrusions 311, 311' are formed on the outer peripheral surface 310a of the anvil 310 continuously at given intervals and correspondingly to the configuration of the ultrasonically-fused parts 8, 8' of the bag 100.

Figure 17:
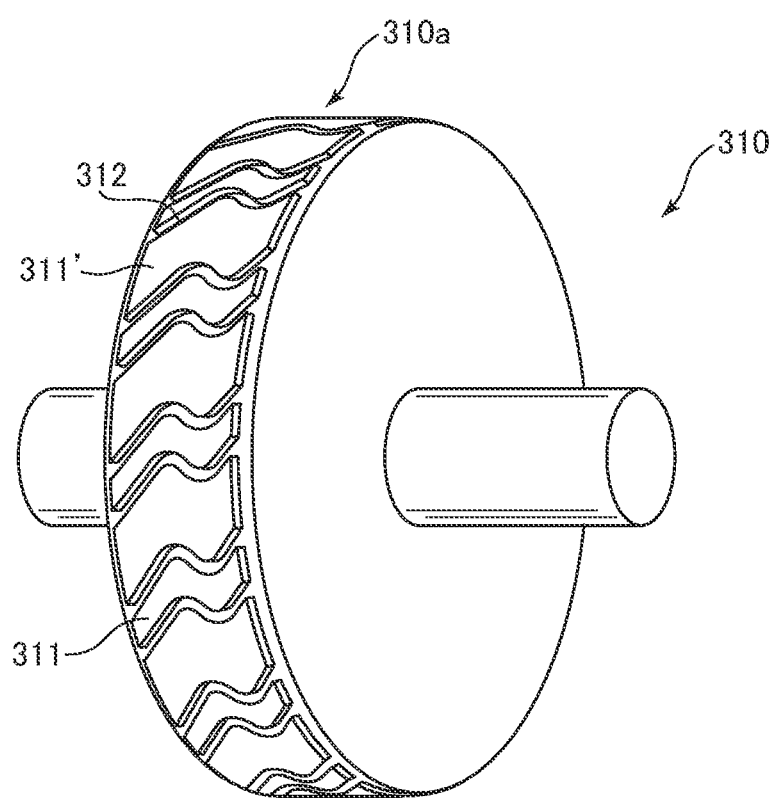
FIG. 17 is a schematic perspective view showing the external appearance of an anvil of the welding apparatus in FIG. 16.

FIG. 17 is a perspective view of the anvil 310. As shown in FIG. 17, in the disk-shaped anvil 310, thick-walled, S-shaped convex portions 311 and 311' each having a shape corresponding to that of a respective one of the jointed parts 8 and 8' of the bag 100 are formed on an outer peripheral surface thereof, wherein a concave (recessed) cutout 312 having a shape corresponding to the non jointed part 10 is provided between each adjacent pair of the convex portions 311 and 311'. That is, a space between each adjacent pair of the convex portions 311 and 311' is formed as a concave (recessed) cutout 312 having a shape corresponding to that of the non-bonded portion 10 of the bag 100. The convex portions 311, 311' and the cutouts 312 mean that the protrusions 311, 311' corresponding to the configuration of the joined parts 10 are formed on the outer periphery 310a of the anvil 310.

When using such an anvil, it is preferable to use a horn having a smooth periphery because it stabilizes the transmission of ultrasonic wave.

Figure 18:
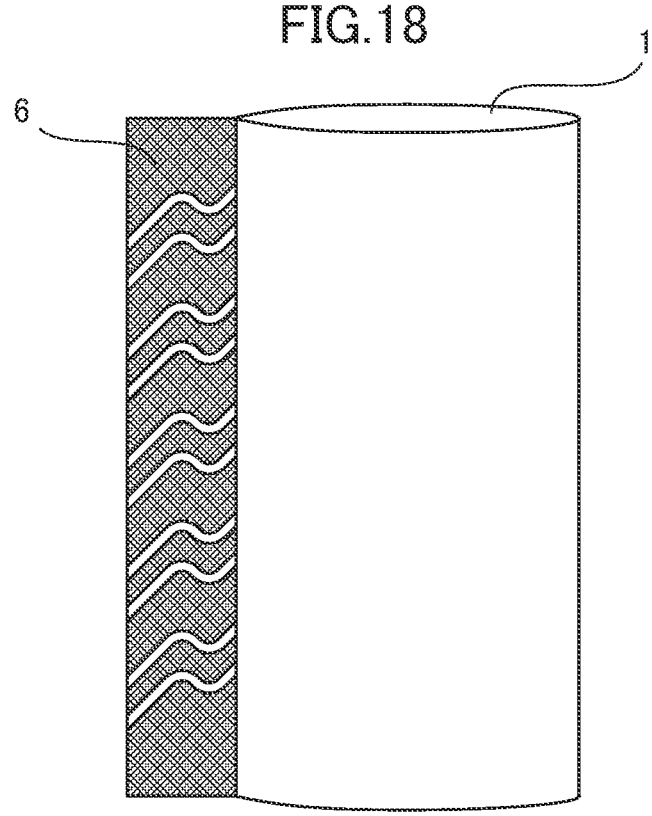
FIG. 18 is a schematic explanatory diagram of a bag production method according to a preferred embodiment of the present invention.

In a welding operation using this rotary welding apparatus 300, the linear ultrasonically-fused parts 8 are continuously formed in the overlapped lateral ends 1a, 1b of the film. Specifically, in a state in which the overlapped lateral ends 1a, 1b of the film are nipped between the horn 308 and the anvil 310, the disc-shaped horn 308 and the anvil 310 are rotated to continuously form the joining region 6 having the plurality of ultrasonically-fused parts (joined parts) 8, 8' and the non-joined parts (ventilation passages) 10 in the overlapped lateral ends 1a, 1b of the long film, as shown in FIG. 18.

Figure 19:
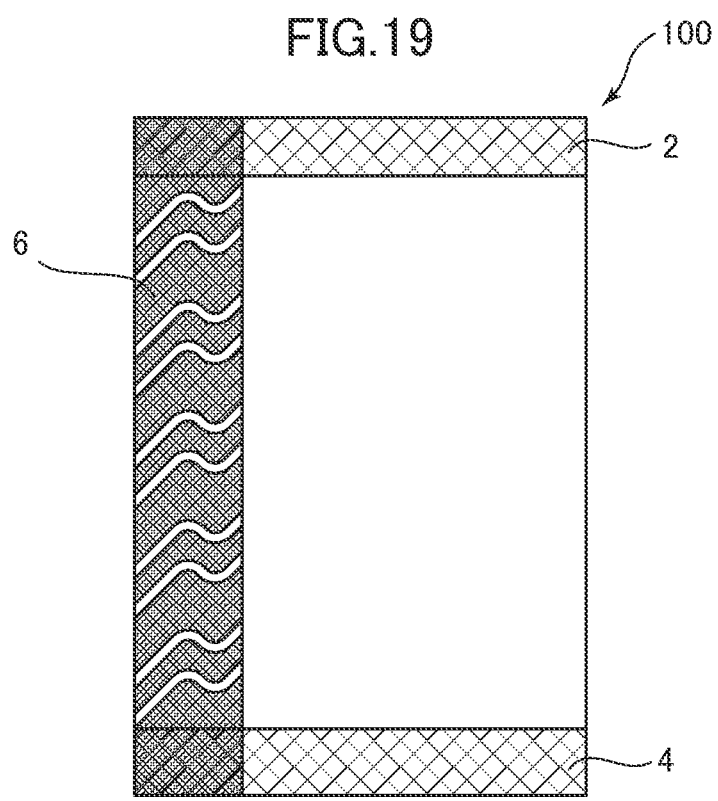
FIG. 19 is a schematic explanatory diagram of the bag production method according to the preferred embodiment of the present invention.

After joining the overlapped lateral ends 1a, 1b in the joining region 6 to form the film into a cylindrical shape, the top seal 2 and bottom seal 4 are further formed to form the cylindrical-shaped film into the bag 100 (FIG. 19). The top seal 2 is generally formed after a content is stored in the bag 100.

The following description will be made about a cylindrical body 400 used for producing the bag 100 in this embodiment. FIG. 20 is a schematic diagram of a bag-forming cylindrical body 400 in this embodiment, As shown in FIG. 20, the bag-forming cylindrical body 400 in this embodiment is formed by folding a long film 401 in a width direction along a longitudinal center line of the film to overlap opposed lateral ends of the film, and joining the overlapped lateral ends in a joining region 406 as in the bag 100 in the first embodiment.

In this joining region 406, a joined part 408 and a non-linear ventilation passage 410 are formed alternately as in the bag 100 in the first embodiment.

This elongated, bag-forming cylindrical body is cut horizontally as shown by the dotted line in FIG. 20, and upper and lower ends of the cut body are sealed by a bottom seal section and a top seal section. Then, the resulting body is used in the same form as that of the bag 100.

It should be understood that the present invention is not limited to the aforementioned embodiments, but various changes and modifications can be made therein within the scope of the technical ideas thereof defined by the appended claims.

EXAMPLES

The present invention will be described in more detail in the following examples.

Example 1

As the film, a styrene acrylonitrile polymer film having a length of 40 cm, a width of 40 cm, and a thickness of 20 μm was used. Opposite surfaces of this film were subjected to static elimination using a fan-type static eliminator KD-410 manufactured by Kasuga Electric Works Ltd. The surface potential of the film after completion of the static elimination was set to be −1 to +1 kV.

Subsequently, an ultrasonic fusion apparatus equipped with a disk-shaped horn was used to form a joining area having a width of 10 mm. The oscillation frequency, oscillation amplitude, pressing pressure and joining time of the horn were set to 20 KHz, 15 μm, 250 N, and 0.2 seconds, respectively.

Figure 7:
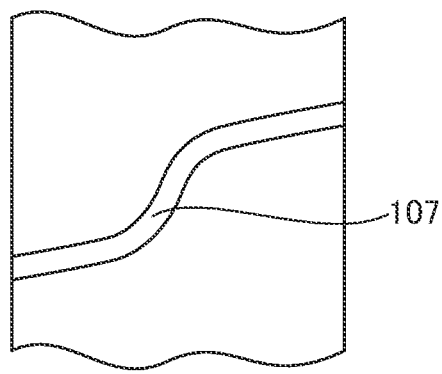
FIG. 7 is a schematic diagram showing still another modification of the ventilation passage composed of the non-joined part.
Figure 8:
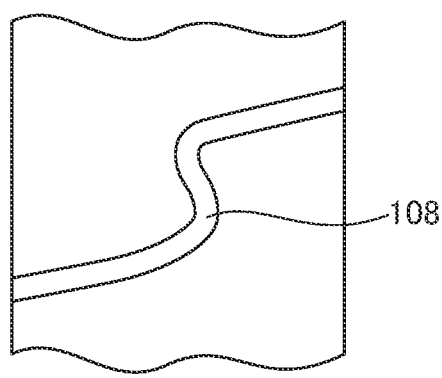
FIG. 8 is a schematic diagram showing yet still another modification of the ventilation passage composed of the non-joined part.

Each of the ventilation passages had the shape as shown in FIG. 7. Further, the interval between two ventilation passage of each ventilation passage pair was set to 10 mm, the width, length L, and L/W of each of the ventilation passages was set to 0.8 mm, 24 mm, and 30, respectively. The interval between adjacent ones of the ventilation passage pairs was set to 12 mm. Then, a bottom seal section was formed by heat sealing.

The ventilation passages of the bag produced in the above manner were subjected to visual observation. As a result, there were no foreign substances and the like in the ventilation passages, and the width of each of the ventilation passages was constant.

150 g of commercial Chinese chive was places in this bag, and a top seal section was formed by heat sealing. This bag was stored at 15° C. for 14 days. As a result, the Chinese chive as the content of the bag was edible without any change in appearance.

Example 2

Example 2 was carried out under the same conditions as those in Example 1, except that: the film material was changed to a stretched polypropylene/unstretched polypropylene (20 μm/30 μm) laminate film; the shape of each of the ventilation passages was changed to the "W" shape as shown in FIG. 5; the width, length L, and L/W of each of the ventilation passages was set to 1.2 mm, 30 mm, and 25, respectively; and the interval between two ventilation passage of each ventilation passage pair was set to 6 mm.

150 g of commercial Chinese chive was placed in this freshness-keeping bag, and a top seal section was formed by heat sealing. This bag was stored at 15° C. for 14 days. As a result, the Chinese chive as the content of the bag was edible without any change in appearance.

Example 3

As the film, an aluminum-deposited polyethylene terephthalate/unstretched polypropylene (16 μm/30 μm, they were laminated to allow the surface of aluminum deposited on the polyethylene terephthalate to come into contact with the unstretched polypropylene) laminate film was used, and the surfaces of opposed lateral ends of the unstretched polypropylene were ultrasonically welded together.

Figure 9:
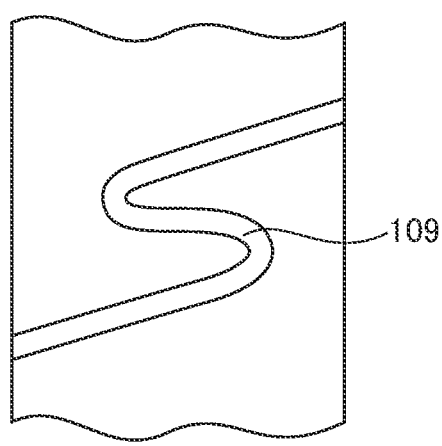
FIG. 9 is a schematic diagram showing another further modification of the ventilation passage composed of the non-joined part.
Figure 10:
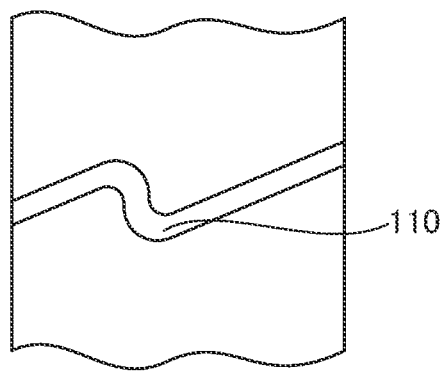
FIG. 10 is a schematic diagram showing still a further modification of the ventilation passage composed of the non-joined part.

Each of the ventilation passages was formed as the ventilation passage as shown in FIG. 9, wherein the width and length of the ventilation passage were set to 1.5 mm and 40, respectively, and L/W was set to 26.7. Further, the interval between adjacent ones of the ventilation passage pairs was set to 25 mm.

Except for the above, Example 3 was carried out in the same manner as that in Example 2. The ventilation passages of an obtained freshness-keeping bag were subjected to visual observation. As a result, there were no foreign substances and the like in the ventilation passages, and the width of each of the ventilation passages was constant. Further, appearance of the bag was good without any film displacement in stripe-patterned joined parts.

Commercial Chinese chive was placed in this bag, and stored at 15° C. for 14 days. As a result, the Chinese chive as the content of the bag was edible without any change in appearance.

Example 4

The width and length of each of the ventilation passages were set to 1.0 mm and 80 mm, respectively, and the value of L/W was set to 80.0. Further, the interval between adjacent ones of the ventilation passage pairs was set to 80 mm. Except for the above, Example 4 was carried out under the same conditions as those in Example 3. The ventilation passages of an obtained freshness-keeping bag were subjected to visual observation. As a result, there were no foreign substances and the like in the ventilation passages, and the width of each of the ventilation passages was constant. Further, appearance of the bag was good without any film displacement in stripe-patterned joined parts. Commercial Chinese chive was placed in this bag, and stored at 15° C. for 14 days. As a result, the Chinese chive as the content of the bag was edible without any change in appearance.

Example 5

Instead of forming the top seal section by heat sealing, a fastener was attached to this section in an openable and closable manner. Except for the above, Example 5 was carried out under the same conditions as those in Example 1. The ventilation passages of an obtained freshness-keeping bag were subjected to visual observation. As a result, there were no foreign substances and the like in the ventilation passages, and the width of each of the ventilation passages was constant. Further, appearance of the bag was good without any film displacement in stripe-patterned joined parts. Commercial Chinese chive was placed in this bag, and stored at 15° C. for 14 days. As a result, the Chinese chive as the content of the bag was edible without any change in appearance.

Example 6

Using the same film as that in Example 2, a bag-forming cylindrical body was produced in the following manner.

First of all, opposite surfaces of the film having a length of 200 cm and a width of 40 cm were subjected to static elimination using a fan-type static eliminator KD-410 manufactured by Kasuga Electric Works Ltd. The surface potential of the film after completion of the static elimination was set to be −1 to +1 kV. Then, overlapped lateral ends of the film were ultrasonically welded together in the same manner as that in Example 2, to obtain a cylindrical-shaped, bag-forming cylindrical body.

This bag-forming cylindrical body was cut into a length of 500 mm, and upper end and lower end of each of the cut bodies were heat-sealed, thereby obtaining four freshness-keeping bags.

Example 7

As the film, a polypropylene film with a length of 75 cm, a width of 28 cm, and a thickness of 30 μm was used. This film was folded in two in a longitudinal direction thereof, and the overlapping ends of the film were ultrasonically welded to form a band-shaped joining region having a length of 75 cm, as in the above embodiment of this application. The width of the joining region was 10 mm, and the ventilation passage similarly to that shown in FIG. 14 was formed therein. A plurality of the ventilation passages is arranged in units of three S-shaped ventilation passages and two linear ventilation passages, wherein this unit is repeated at a pitch of 3.3 cm.

The S-shaped ventilation passage has a width W of 0.8 mm and a length L of 3.0 mm, and the linear ventilation passage has a width W of 0.8 mm and a length L of 10 mm. For ultrasonic welding, the apparatus as shown in FIG. 11 was used. A horn having a smooth outer periphery was used, and an anvil similar to that as shown in FIG. 16 was used. This anvil had a disk shape, wherein protrusions each having a shape corresponding to that of a respective one of the ventilation passages were formed on the outer periphery of the anvil.

The oscillation frequency, oscillation amplitude, pressing pressure and joining rate of the horn were set to 20 KHz, 15 μm, 250 N and 120 cm/min, respectively.

The ventilation passages of the bag produced in the above manner were subjected to visual observation. As a result, there were no foreign substances and the like in the ventilation passages, and the width of each of the ventilation passages was constant.

Then, a bottom seal section was formed by heat sealing. 500 g of Chinese yam was placed in this bag, and a top seal section was formed by heat sealing.

This bag was stored at 15° C. for 14 days. As a result, the Chinese yam as the content of the bag was edible without any change in appearance.

Example 8

Example 8 was carried out in the same manner as that in Example 7, except that a polyethylene film having a length of 75 cm, a width of 28 cm, and a thickness of 30 μm was used as the film, and the shape of the ventilation passage was changed as follows.

In Example 8, a plurality of the ventilation passages are arranged in units of two S-shaped ventilation passages as shown in FIG. 1, wherein this unit is repeated at a pitch of 3.0 cm. The S-shaped ventilation passage has a width W of 0.8 mm and a length L of 30 mm.

A bottom seal section was formed by heat sealing. 500 g of Chinese yam was placed in this bag, and a top seal section was formed by heat sealing. This bag was stored at 15° C. for 14 days. As a result, the Chinese yam as the content of the bag was edible without any change in appearance.

Example 9

Example 9 was carried out under the same condition as that in Example 7, except that a polyethylene film having a length of 30 cm, a width of 28 cm, and a thickness of 30 μm was used as the film.

For an obtained bag, a bottom seal section was formed by heat sealing. Twelve asparaguses each having a length of 20 cm were placed in this bag, and a top seal section was formed by heat sealing. This bag was stored at 15° C. for 14 days. As a result, the asparaguses as the content of the bag were edible without any change in appearance.

Example 10

As the film, a vinyl chloride film with a length of 60 cm, a width of 80 cm, and a thickness of 150 μm was used. This film was folded in two in a longitudinal direction thereof, and the overlapping ends of the film were ultrasonically welded to form a band-shaped joining region having a length of 60 cm and a width of 15 mm. A plurality of ventilation passages each having the configuration as shown in FIG. 11 were formed in the above joining region. The ventilation passages are arranged in units of one lightning-shaped ventilation passage, wherein this unit is repeated at a pitch of 5.0 cm. Each of the ventilation passages has a width W of 3 mm and a length L of 40 mm.

The oscillation frequency, oscillation amplitude, pressing pressure and joining rate of the horn were set to 20 KHz, 15 μm, 300 N and 60 cm/min, respectively.

For an obtained bag, a bottom seal section was formed by heat sealing. 8 kg of dried cow dung was placed in this bag, and a top seal section was formed by heat sealing.

This bag was stored in an atmosphere at 25° C. and 70% RH for 30 days. As a result, there was neither damage of the bag nor change in appearance of the content.

The invention claimed is:

1. A method of producing a freshness-keeping bag formed of a film, wherein the freshness-keeping bag has a band-shaped joining region in which two ends of the film are overlapped and joined together with a width of 5 mm to 15 mm, the joining region comprising: a plurality of joined parts in which the two ends of the film are joined directly together without any intermediary sheet between the two ends of the film; and a plurality of non-joined parts which are located between adjacent ones of the joined parts, wherein the overlapped ends of the film are not joined together in each non-joined part, each non-joined part comprising a non-linear ventilation passage devoid of any obstructing filling throughout the passage and going through the joined parts to establish communication between an internal space of the bag and an outside of the bag, and each ventilation passage having a width W and a length L satisfying the following relations: $0.2\ \text{mm} \leq W \leq 3\ \text{mm}$, and $10\ \text{mm} \leq L \leq 50\ \text{mm}$, respectively, the method comprising the step of forming the joined parts by ultrasonic welding, wherein the step of forming the joined parts includes continuously forming the joined parts in the film, while rotating a disk-shaped ultrasonic welding anvil with respect to the film, the ultrasonic welding anvil having a plurality of protrusions formed on an outer periphery thereof continuously at given intervals and correspondingly to a configuration of the joined parts of the bag.

2. The method as recited in claim 1, wherein the film has an oxygen barrier layer.

3. The method as recited in claim 1 or 2, wherein the film has a thickness of 20 μm to 200 μm.

4. The method as recited in any one of claims 1 to 3, wherein the film is one selected from the group consisting of polyethylene, polypropylene, vinyl chloride, styrene acrylonitrile copolymer, and laminate films thereof.

* * * * *